No. 860,613. PATENTED JULY 16, 1907.
J. B. VAIL.
WINDMILL REGULATOR.
APPLICATION FILED SEPT. 22, 1906.
2 SHEETS—SHEET 1.
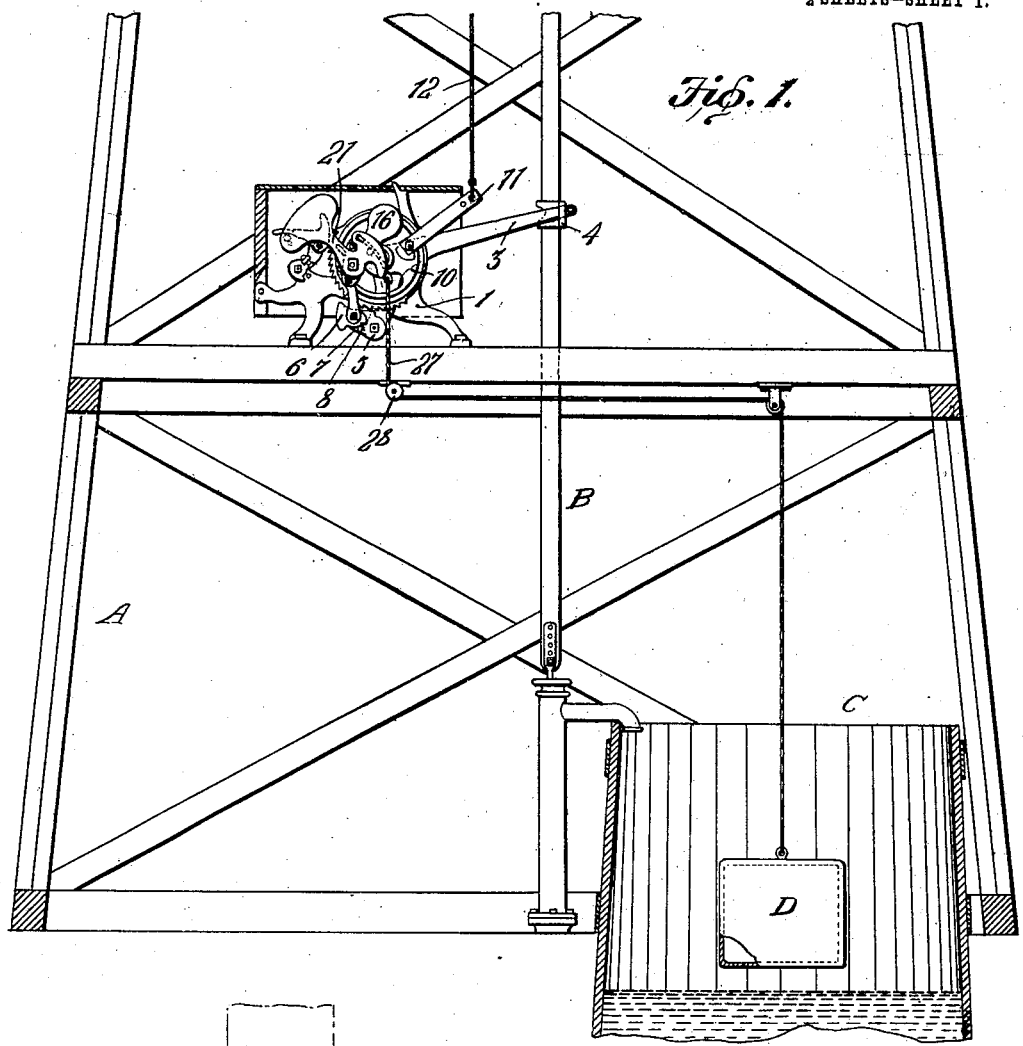
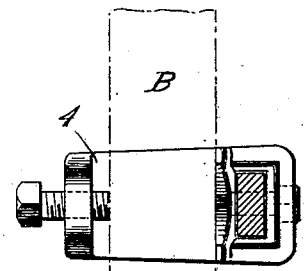
WITNESSES:
James B. Vail,
INVENTOR
By C. A. Snow & Co
ATTORNEYS

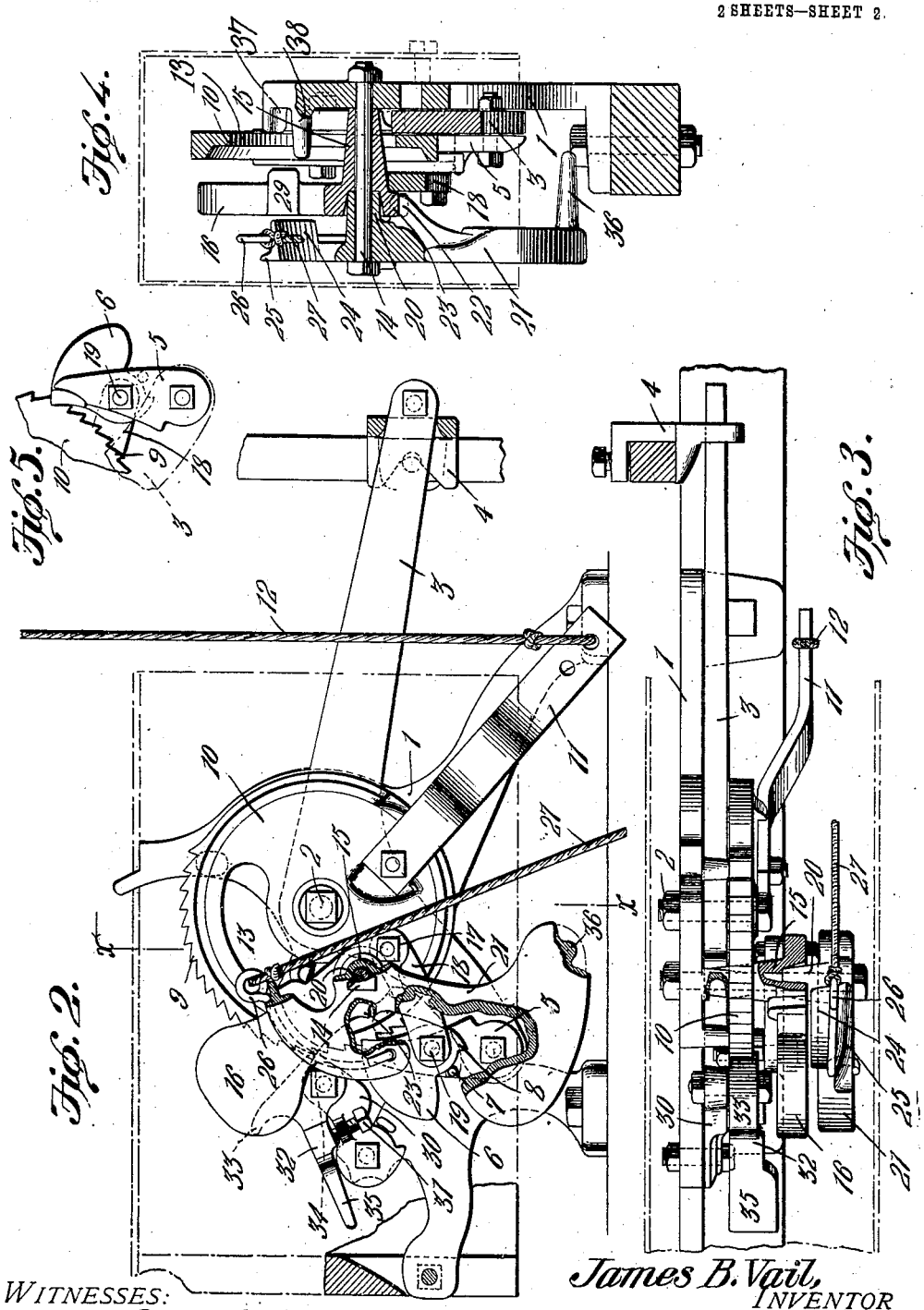

UNITED STATES PATENT OFFICE.

JAMES B. VAIL, OF WESTON, MICHIGAN, ASSIGNOR TO WELLINGTON C. SMITH, OF WESTON, MICHIGAN.

WINDMILL-REGULATOR.

No. 860,613.      Specification of Letters Patent.      Patented July 16, 1907.

Application filed September 22, 1906. Serial No. 335,811.

*To all whom it may concern:*

Be it known that I, JAMES B. VAIL, a citizen of the United States, residing at Weston, in the county of Lenawee and State of Michigan, have invented a new and useful Windmill-Regulator, of which the following is a specification.

This invention relates to regulators for wind mills and its object is to provide simple and compact mechanism adapted to automatically stop the wind mill when the water which has been pumped into a tank by the wind mill has reached a predetermined level.

A still further object is to provide mechanism which will automatically throw the wind mill into operative position should the water within the tank drop below a predetermined level.

With the above and other objects in view the invention consists of a rocking lever adapted to be connected to the pump rod and this lever carries a pawl adapted to engage and actuate a pivotally mounted ratchet carrying an arm adapted to be connected to the mechanism of the wind mill for pulling the wheel out of the wind. Float operated mechanism is provided for throwing the pawl of the lever into or out of operative relation with the ratchet so as to enable the wheel of the wind mill to move into the wind or to be pulled therefrom according to the quantity of water within the tank.

The invention also consists of certain other novel features of construction and combinations of parts which will be hereinafter more fully described and pointed out in the claims.

In the accompanying drawings is shown the preferred form of the invention.

In said drawings: Figure 1 is a section through a portion of a wind mill tower and showing a tank in section and the regulating mechanism connected to the float within said tank; Fig. 2 is an enlarged elevation of the regulating mechanism and showing the positions of the parts when the wheel is held out of operative position, portions of the weighted arm being broken away to show the parts in rear thereof; Fig. 3 is a plan view of the mechanism with the parts in the position shown in Fig. 2, portions of one of the sleeves being broken away; Fig. 4 is a section on line *x—x* Fig. 2; Fig. 5 is a detail view of a portion of the ratchet and the actuating pawl; and Fig. 6 is a detail view of the clamp for connecting the pump rod to the regulator.

Referring to the figures by characters of reference, A is a portion of a wind mill tower through which extends a pump rod B. The tank C of the wind mill has a float D therein for the purpose hereinafter described. Arranged on one of the cross beams of the tower A is a frame 1 from which extends a pivot bolt 2 on which is mounted an operating lever 3. This lever is fulcrumed between its ends and one end thereof carries a clamp 4 adapted to be secured to the pump rod B while the other end of the lever has a link 5 pivoted thereon and carrying an operating pawl 6. A lug 7 is arranged on the link and the pawl has shoulders 8 for contacting with the lug to limit the movement of the pawl.

Pawl 6 is adapted to engage the teeth 9 of a ratchet 10 which is pivotally mounted to rock on the pivot bolt 2 and has an arm 11 extending therefrom and adapted to be connected by a rod or cable 12 with the wheel (not shown) of the wind mill. This ratchet has a slot 13 therein concentric with the pivot thereof and projecting through this slot is a pivot bolt 14 which extends from the frame 1 and on which is rotatably mounted a sleeve 15. A weight 16 is formed integral with this sleeve and extends upward therefrom while formed on the sleeve directly opposite the weight 16 is an ear 17. A link 18 is pivoted to this ear and is connected to the pivot 19 of the pawl 6. Another sleeve 20 is loosely mounted on the bolt 14 and projects loosely into the sleeve 15. This sleeve 20 has a weighted arm 21 from which projects an inwardly extending lug 22 adapted to work between shoulders 23 formed on the sleeve 15 so that the arm 21 has a limited movement in each direction independently of sleeve 15 subsequent to which said sleeve and the weight 16 formed therewith are caused to move with the arm 21. A curved flange 24 is formed upon the inner face of a curved plate 25 integral with sleeve 20 and this plate constitutes a rest for a rod 26 which is pivotally connected to one end of the plate 25. A chain or cable 27 is fastened to the free end of the rod 26 and extends downward over the pulley 28 on the tower A and is secured to the float D. A lug 29 extends inward from the weight 16 and is adapted to contact with the end of the pivot bolt 2 to limit the movement of said weight in one direction.

A link 30 is pivoted upon the frame 1 adjacent the ratchet 10 and this link carries an adjusting screw 31 which constitutes a stop for a holding pawl 32 having a curved head 33 at one end terminating in a shoulder 34 adapted to normally engage the ratchet so as to hold it against movement in one direction. The other end of the pawl is enlarged as shown at 35 and projects into the path of a finger 36 extending inwardly from the arm 21.

The weight of the float D is much greater than that of the arm 21 and therefore when the water is low within the tank C this weight will be suspended by the chain or cable 27 and will pull on the rod 26 and cause the weighted arm 21 to swing on its pivot thereby moving its lug 22 against one of the shoulders 23 on sleeve 15 and throwing the weight 16 past the center of gravity. The ear 17 will therefore swing the link 18 and throw the pawl 6 out of engagement with the ratchet 10. The finger 36 will also swing into contact with the enlarged end 35 of pawl 32 and remove the shoulder 34 of the pawl from engagement with the ratchet and bring the curved face of the head 33 into position on the teeth. The ratchet is thus free to partly rotate on its pivot and as the wheel of the wind mill is released from all restraint it will automatically turn into the wind thereby swinging the arm 11 upward by reason of its connection therewith. As soon as the wheel begins to rotate the pump rod B will of course be reciprocated and result in the discharge of water into the tank C. The lever 3 will be actuated by the reciprocating pump rod and as the pawls 6 and 32 are out of engagement with the ratchet 10 this movement of the lever will be without effect. As the water rises above a predetermined level in the tank it will raise the float and as soon as the weighted arm 21 is released of the weight of the float it will swing downward by gravity so that the finger 36 will move away from pawl 32 and cause it to automatically reassume its position in engagement with the ratchet. The lug 22 of the weighted arm 21 will also strike one of the shoulders 23 on sleeve 15 and throw the weight 16 past the center of gravity so as to cause the ear 17 to pull on link 18 and move the pawl 6 into engagement with the ratchet. The further reciprocation of the pump rod and consequent movement of lever 3 will therefore cause the pawl 6 to intermittently act upon the ratchet and slowly rotate it, the pawl 32 serving to hold the ratchet against return movement during its operation. The arm 11 will therefore be swung downward and will pull on the rod or cable 12 so as to adjust the wheel of the wind mill out of the wind and stop the actuation of the pump rod. When the water within the tank C has dropped below the predetermined level the operation hereinbefore described will be repeated.

The utmost importance is attached to the weight 16 because, after the same has been moved in one direction past the center of gravity, it promptly drops and moves the pawl 6 into engagement with the ratchet and before the arm 21 has reached the limit of its movement, thereby preventing the wear which would be occasioned by the slow engagement of the pawl with the ratchet. The weight acts in the same manner when moving in the opposite direction for the purpose of withdrawing the pawl from engagement with the ratchet. It will be noted that the frame 1 is provided with a series of lugs 37 which serve to hold the ratchet wheel properly spaced from the frame, and another lug 38 extends from the frame into the slot 13 for the purpose of limiting the upward movement of the arm 11. The clamp 4 is so constructed that the entire regulator can be disposed at any desired angle to the sides of the tower A to accommodate it for use in connection with tanks disposed at any point in relation to the tower. The walls of the opening in the clamp are beveled to permit the arm 3 to work at any angle therethrough in order to permit the various arrangements referred to.

Importance is also attached to the provision of the adjusting screw 31 which is used in connection with the pawl 32, because by providing this screw the pawl can be readily adjusted and considerable expert workmanship can therefore be dispensed with in order to get the pawl in proper position to operate in the manner desired.

It will be seen that the mechanism herein described is very simple in construction and can not easily get out of order because of the lack of springs or other elements which are susceptible to injury. All of the parts of the device are formed of heavy castings and the entire mechanism is preferably inclosed within a casing 39 so as to be protected from the elements.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. A wind mill regulator comprising an oscillatory wheel-adjusting rock arm, a ratchet movable therewith, a pump-rod operated lever, a pawl carried thereby, a pivoted weight for shifting the pawl in or out of engagement with the ratchet, and a float-operated weighted arm for swinging the weight past its center of gravity to throw the pawl into or out of engaging position.

2. A wind mill regulator comprising an oscillatory wheel-adjusting rock arm, a ratchet movable therewith, a pump-rod actuated lever, a pawl carried thereby, a weight pivotally mounted adjacent the lever, a link connection between the weight and pawl, and a float-operated weighted arm for shifting the weight past its center of gravity to throw the pawl into or out of engaging position.

3. A wind mill regulator comprising an oscillatory wheel-adjusting rock arm, a ratchet movable therewith, a pump-rod actuated lever, a link pivotally connected thereto, a pawl pivotally mounted on the link, a weight loosely pivoted adjacent the lever, a link connection between the weight and pawl, a float-actuated weighted arm pivoted adjacent said weight, and means upon the arm and movable therewith for bearing against the weight to throw the same past its center of gravity to shift the pawl in or out of engagement with the ratchet.

4. A wind mill regulator comprising an oscillatory wheel-adjusting ratchet, a link pivotally mounted adjacent thereto, a holding pawl pivotally mounted on the link and normally seated by gravity in engagement with the ratchet, means for adjusting the pawl upon its link, a pump-rod actuated lever, a pawl movably connected thereto, a weight pivoted adjacent the lever, a link connection between the weight and pawl, and a float-operated weighted arm for shifting the weight past its center of gravity to throw the pawl of the lever into or out of engagement with the ratchet.

5. A wind mill regulator comprising an oscillatory adjusting ratchet, a pump-rod actuated lever, a link pivotally connected to the lever, a pawl pivoted upon the link, a weight pivoted adjacent the lever, a link connection between the weight and pawl, a weighted arm, a projection thereon movable against the weight to shift the same past its center of gravity, a curved flange extending from the weighted arm, a float, and a connection between the float and arm, said connection bearing upon the flange.

6. A wind mill regulator comprising a frame, a wheel-adjusting ratchet pivotally mounted thereon, a movably supported pawl normally engaging the ratchet, an operating lever, a movably supported pawl carried thereby, an oscillating weight, a movable connection between the weight and the pawl of the lever, said weight adapted to hold the pawl in, or out of engagement with the ratchet, a weighted rock arm, means for connecting the float thereto, and projections upon said arm for actuating the weight and the first mentioned pawl respectively.

In testimony that I claim the foregoing as my own, I have hereto affixed my signature in the presence of two witnesses.

JAMES B. VAIL.

Witnesses:
JOSEPH CONOVER,
H. C. RETAN.